(12) United States Patent
Gauthier et al.

(10) Patent No.: US 6,485,866 B1
(45) Date of Patent: Nov. 26, 2002

(54) LIPO$_3$-BASED COATING FOR COLLECTORS

(75) Inventors: Michel Gauthier, La Prairie; Simon Besner, Coteau du Lac; Michel Armand, Montreal; Jean-François Magnan, Neuville; Hugues Hamelin, Cap-de-la-Madeleine; André Bélanger, Ste-Julie, all of (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/544,133

(22) Filed: Apr. 6, 2000

(30) Foreign Application Priority Data

Apr. 7, 1999 (CA) .............................................. 2268355

(51) Int. Cl.[7] ................................................ H01M 4/70
(52) U.S. Cl. ...................... 429/245; 429/232; 429/231.1
(58) Field of Search .............................. 429/232, 231.1, 429/245, 218.1

(56) References Cited

U.S. PATENT DOCUMENTS 5,547,782 A * 8/1996 Dasputa et al. .............. 429/194
5,705,291 A * 1/1998 Amatucci et al. ........... 429/137

* cited by examiner

*Primary Examiner*—Carol Chaney
(74) *Attorney, Agent, or Firm*—Katten Muchin Zavis Rosenman

(57) ABSTRACT

The present invention is concerned with a protective coating with current applied on a metallic collector of an electrode. The protective coating comprises a mineral binder vitreous or partly vitreous and optionally an electronic conduction additive. This coating is applied in the form of a solution or dispersion on the collector of the electrode and dried, so that it coats and protects at least part of the surface of the metal of the collector to prevent the formation of passivation films generated by active species produced by other components of the generator.

22 Claims, 4 Drawing Sheets

Figure 2A:
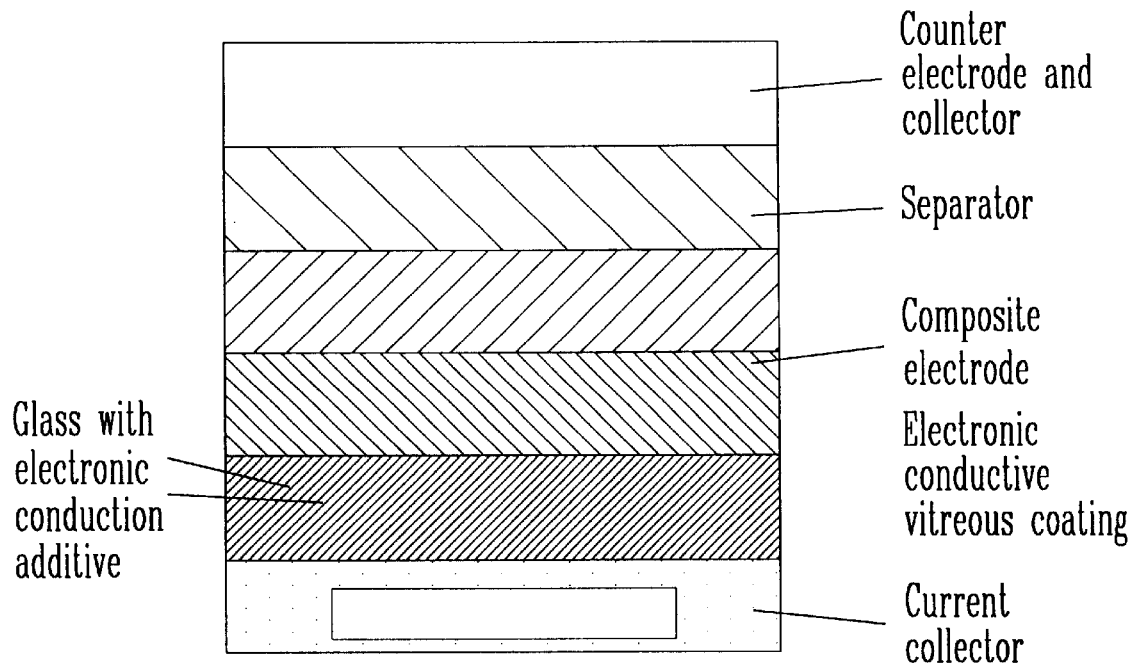
Figure 2B:
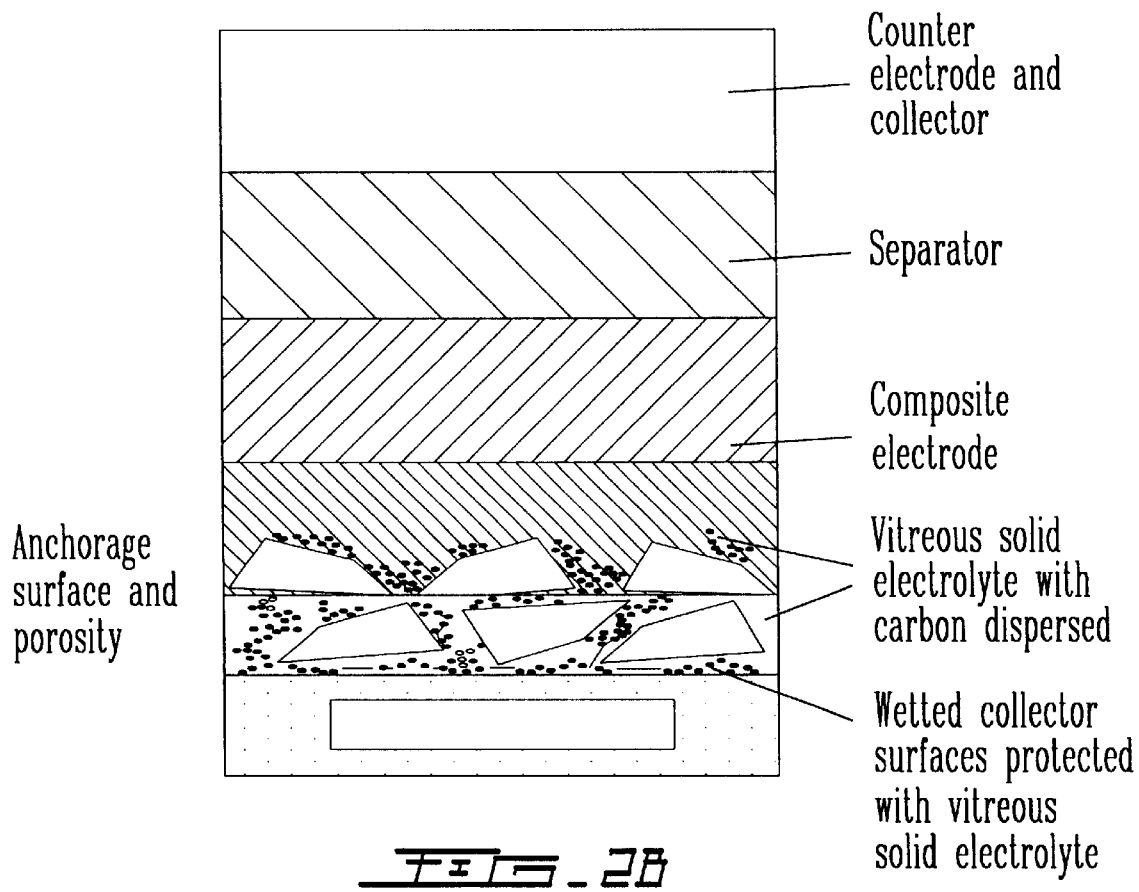

Composite electrode after cycling showing the passivation area of the current collector

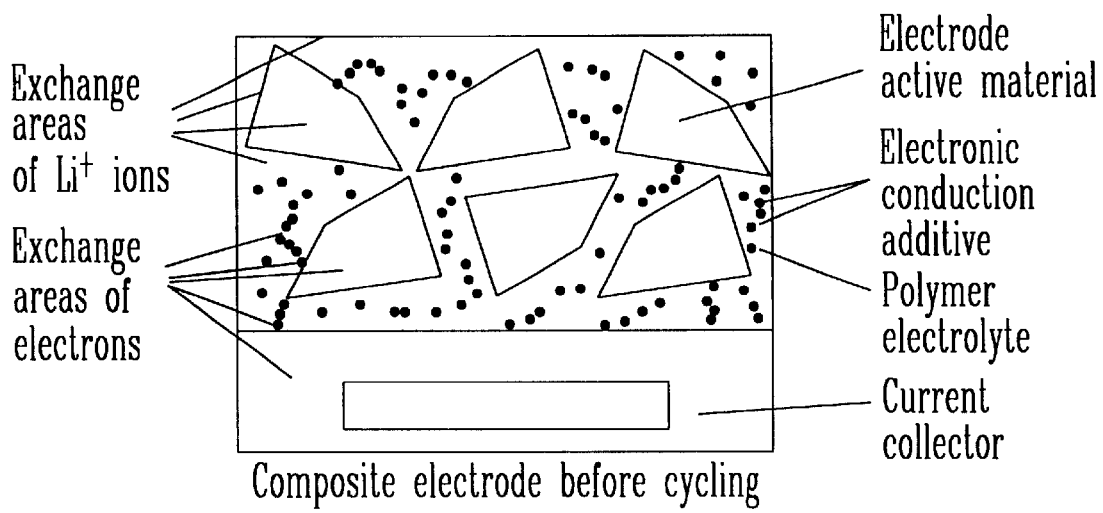
FIG_1A
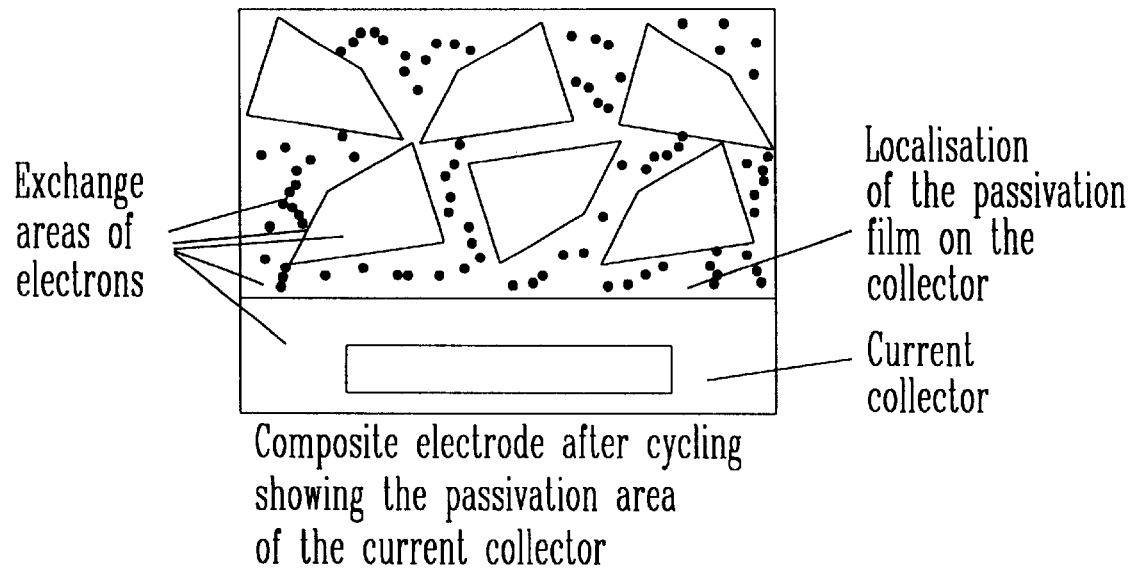
FIG_1B

# $LIPO_3$-BASED COATING FOR COLLECTORS

FIELD OF INVENTION

The present invention is concerned with a protective coating with current applied on a metallic collector of an electrode. The protective coating comprises a mineral binder partially or completely vitreous and optionally an electronic conduction additive. This coating is applied in the form of a solution or dispersion on the collector of the electrode and dried, so that it coats and protects at least part of the surface of the metal of the collector to prevent the formation of insulating films generated by active species originating from other components of the generator.

BACKGROUND OF THE INVENTION

In principle, lithium batteries offer the unique advantage of reaching unsurpassed volumic and specific energies that render them particularly interesting for a wide range of applications, whether stationary or mobile, from microelectronics, portable electronics to large installations for electrical vehicles or hybrids.

These systems generally use liquid aprotic electrolytes mainly of the lithium-ion type, and more recently polymer electrolytes, the latter being either of the dry solvating type polymer, working between 40 and 100° C. with lithium anodes, or of the gelified type, using a solvating or non-solvating polymer, and working at room temperature because of the addition of aprotic polar liquid solvents associated with lithium-ion type electrodes having cathodes working at elevated tensions (~4V). The extreme operating conditions of temperature or tension of these systems cause the various components of the generator to age under cycling and/or in function of the time.

The components aging is evident at the current collectors level, and results in the formation of passivation films or in the degradation of the surface of the collectors because of the reactions between the components of the generator, namely the active materials of the electrodes, and the chemical components of the organic electrolyte. The formation of such films, more or less insulating, at the interfaces, significantly alters the quality of the electronic exchanges between the collectors and the electrode active materials, which are generally present in the form of composite.

In a polymer electrolyte medium, the effect of the passivation phenomenons is sometimes amplified because in the solid state, the products formed by the reactions of the organic solvent, the lithium salt, the electrode materials or from other components of the generator, tend to accumulate at the interface because of the lack of the convection of the solvent or the solubilization of the films formed, or because of the lack of corrosion/dissolution reaction of the metal and the renewal of the exchange surface. The attack of the collectors or the formation of passivation films at the surface by the oxidation-dissolution of the metallic conductor is generally caused by electrochemical reactions, namely oxidation or reduction, initiated by radicals, acid-base reactions or oxidation-reduction chemical reactions more or less catalyzed by the materials present.

FIGS. 1a) and 1b) illustrate a collector/electrode composite assembly and the localization of the passivation film at the interface collector/electrode after cycling.

Passivation phenomenons are particularly evident in the case of aluminium collectors, which are frequently used because of their low cost and their thermal and electrical conduction properties with cathode associated with end of charge voltages frequently higher than 3 and even 4 volts.

In lithium-ion type systems using liquid electrolytes or gelified polymers with liquids, the corrosion of the aluminium of the cathode collector is generally prevented through the use of a salt or a fluorinated additive of the type $LiBF_4$ and $LiPF_6$ that easily form a fluorinated film at the surface of the aluminium, or with an oxidative anion $ClO_4^-$, thus preventing deep corrosion or dissolution of the aluminium collector. With other particularly stable fluorinated salts such as TFSI of formula $(CF_3SO_2)_2NLi$, the corrosion of aluminium above 4 volts can lead to the complete disintegration of the collector.

In dry polymer medium, the formation of passivation films on the aluminium collector of a vanadium oxide-based cathode ($V_2O_5$) does not lead to the dissolution of the collector, but rather to the formation of passivation films more or less insulating, that increase the electrical resistance between the collector and the composite cathode. There is then observed the formation of oxygen and fluorine-based oxidation films of aluminium, which are visible under electronic microscopy, that reach thicknesses higher than that of alumina films initially present at the surface of the aluminium. Such films are more or less electrical insulators and thus impair the passage of electrons between the collector and the electronic conduction and active materials present in the cathode.

It has been known for a long time to protect the metallic current collectors of electrochemical accumulators from passivation/dissolution phenomenon by coating the latter with an electronically conductive carbonated coating that is not very oxidizable. Generally, carbon black dispersions in organic or mineral binders are used in the form of a layer more or less impermeable to the electrolyte of the generator to prevent electrochemical corrosion phenomenons. Further, these coatings prevent a direct contact of the collector with the electrode active materials (see for example U.S. Pat. No. 5,262,254). Such solutions are used successfully in various commercial applications. However, none of them is perfectly satisfactory, particularly when the electrochemical generators are used in extreme conditions as described above, and over extended period of times, notably because of the lack of impermeability and chemical or electrochemical stability of the organic binders, or the metallic conduction additives or conjugated polymers.

U.S. Pat. No. 5,580,686 (Fauteux et al.) describes a carbon-based protective coating ("primer") dispersed in a metallic polysilicate used in an electrolytic cell of the lithium-ion type containing a cobalt oxide cathode and a graphite anode. The polysilicates comprise several limitations because of their strong basicity. For example, they are reactive towards acidic electrode active materials such as vanadium oxide. Further, they are chemically reactive with iron phosphate-type materials. The basic character renders them incompatible with conduction additives made of conjugated polymers of the polyaniline type, doped polypyrole type etc.

In most applications, carbon is generally the preferred additive because of its high chemical inertia and its resistance to electrochemical corrosion.

SUMMARY OF THE INVENTION

The present invention is concerned with an electrochemical generator comprising a separating electrolyte between two electrodes, wherein at least one of the electrodes comprises a metallic current collector coated at least partially with a conductive coating, chemically compatible with the adjacent electrode material, the coating comprising a vitreous or partly vitreous mineral binder comprising an alkaline metal phosphate, an alkaline metal polyphosphate, an alkaline metal borate, an alkaline metal polyborate, or mixtures thereof, wherein at least one electronic conduction additive ensuring electronic exchanges between the electrode and the collector is optionally dispersed, the coating being contacted with the collector to protect the coated metallic surface from the formation of passivation films generated by reactive species originating from the generator components.

In a second aspect of the present invention, there is provided a process for coating, at least partly, the surface of a metallic collector of an electrode with a passivation protector, the process comprising:

a) preparing an aqueous dispersion solution of a mineral binder being vitreous or partly vitreous, and comprising an alkaline metal phosphate, an alkaline metal polyhphosphate, an alkaline metal borate, an alkaline metal polyborate, or mixtures thereof that is neutralized to ensure compatibility of the binder with the active material of the electrode and wherein at least one electronic conduction additive is dispersed;

b) coating the surface of the metallic collector with the dispersion prepared in step a), and drying to produce a partly or completely coated surface of the metal to prevent formation of passivation films generated by active species from other components of the generator.

In a third aspect of the present invention, there is provided an electrode comprising a metallic current collector coated in whole or in part with a protective conductive coating, chemically compatible with the adjacent electrode material, the coating comprising a vitreous or partly vitreous mineral binder wherein is optionally dispersed an electronic conduction additive ensuring electronic exchanges between the electrode and the collector, the coating being contacted impermeably with the collector to protect the metallic surface coated from the formation of passivation films generated by reactive species from generator components.

IN THE DRAWINGS

FIGS. 1a and 1b illustrate a collector/electrode composite and the localization of the passivation film at the collector/electrode interface after cycling;

FIGS. 2a) and 2b) illustrate and electrochemical generator comprising a collector having its surface coated with a coating according to the present invention.

Figure 3:
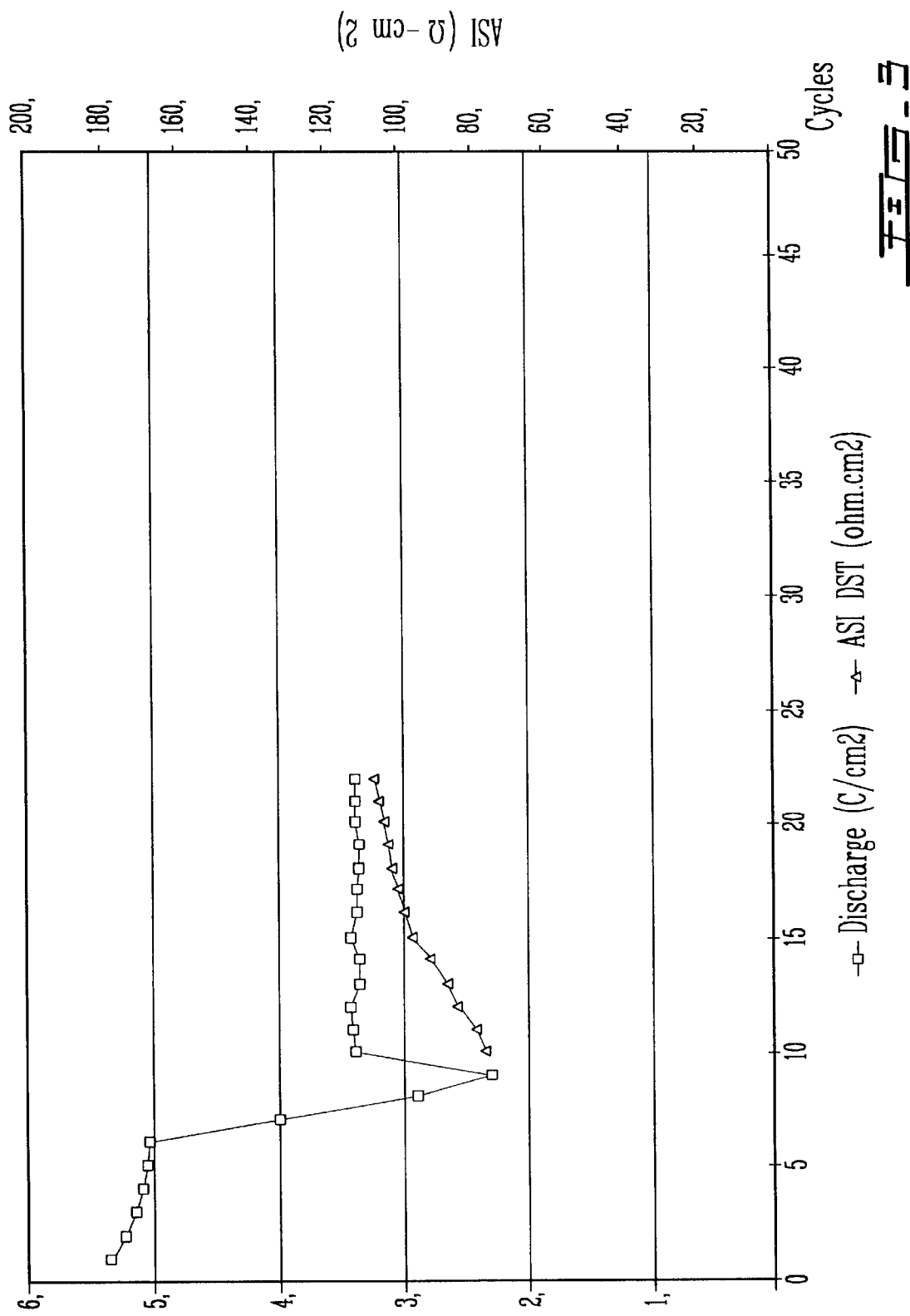
Figure 4:
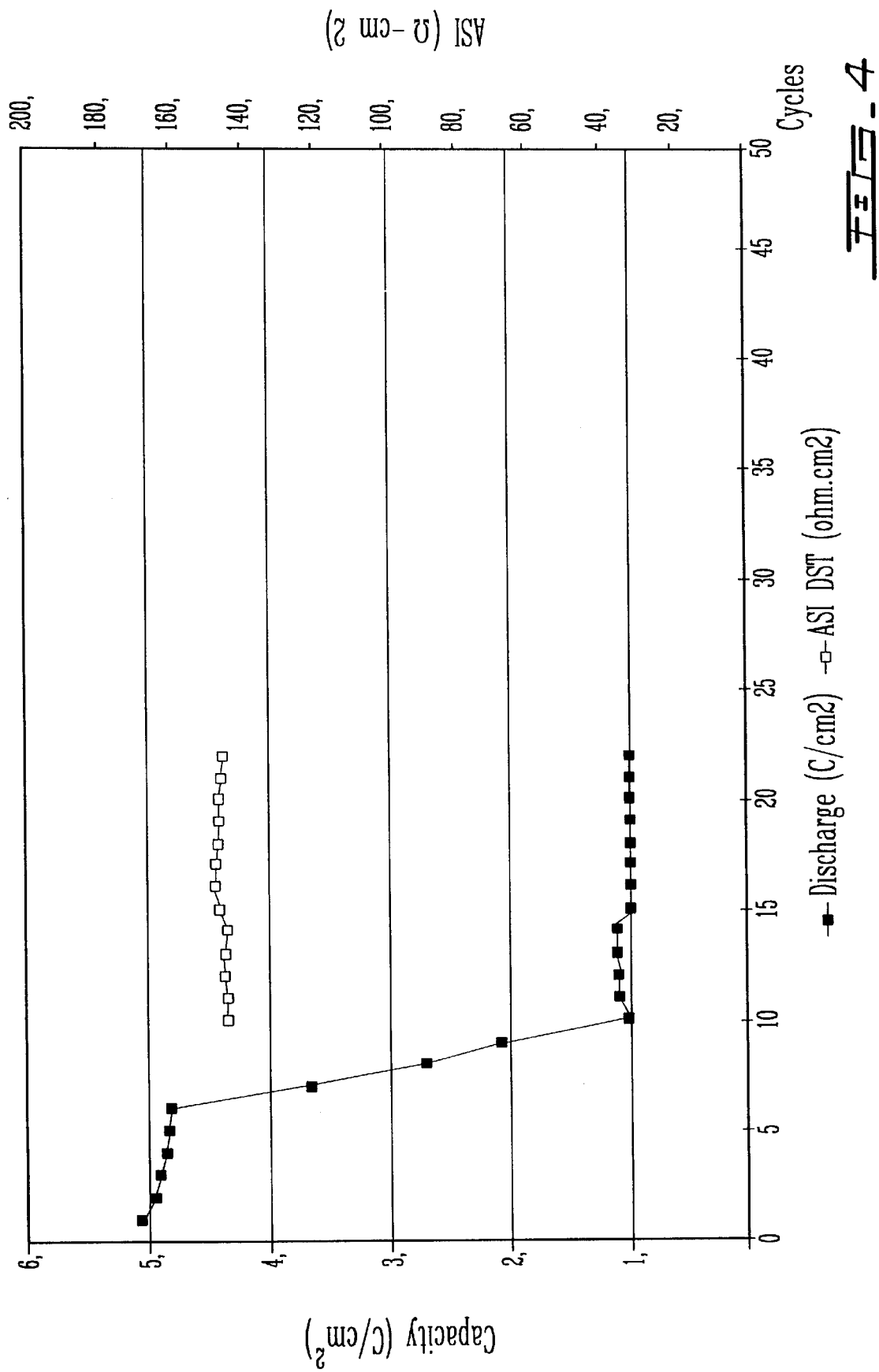

FIGS. 3 and 4 illustrate the cycling results of the electrochemical generator described in example 3 in the presence of a $(LiPO_3)_n$-based protective coating of the collector and carbon black (FIG. 3) and in the absence of such a coating (FIG. 4).

DETAILED DESCRIPTION OF THE INVENTION

The present invention uses a vitreous or partly vitreous mineral binder comprising a phosphate, a polyphosphate, a borate, or a polyborate of an alkaline metal such as lithium or potassium, either alone or in admixtures, into which is optionally dispersed at least one electronic conduction additive. The phosphate-based compounds represent a preferred embodiment to wet and thus protect the metallic collectors used in electrochemical generators. Further, these compounds, in solution in water, allow the control of the pH and thus prevent acid-base reactions between the mineral binder and the additives or the electrode materials during the use of the films in the electrochemical generator. Glass-forming additives such as hydrolyzed silica, siloxanes, aluminates, organometallic titanates partly or completely hydrolysed are included in the present invention as long as they remain chemically compatible with the conduction additives and with the electrode active materials, i.e., as long as their acid-base properties can be controlled to prevent chemical reactions impairing the operation of the generator. The glass-forming additive is preferably added in the form of an aqueous or alcohol solution to the mineral binder solution before neutralization, which is preferably performed at a pH comprised between 4 and 9.

Various electronic conduction additives are possible with the binders of the present invention. Examples include carbon black, graphites, metals such as copper and silver, metallic conductive mineral compounds of the carbide type, nitride-type, silicide-type or even metallic chalcogenide or doped conjugated polymers such as polyanilines, polypyroles etc., and mixtures thereof. Carbon black and graphite are preferred electronic conduction additives, and can be added in an amount preferably varying between 2 and 20% by volume. These additives are preferably added in the form of a dispersion in the mineral binder in a pure or mixed state, or in a manner such as to induce an electronic conductivity essential for the maintenance of the electron exchanges between the metallic substrate and the electrode active materials. Non-carbonated additives are particularly advantageous in high power systems wherein the level of conductivity required is sharply higher than 1 S/cm.

An important property sought for the mineral binder is its capacity to wet and protect the metallic surface of the current collector, in order to prevent access to the components of the generator at the surface thereof, more specifically, the electrolyte, the electrode active materials etc. The area protected not being submitted to corrosion/passivation reactions, and optionally comprising a conduction additive, is sufficient to maintain a permanent electronic contact between the contacted metal and the conductive components of the adjacent electrode.

In a dry polymer medium, wherein the complete dissolution of the collector is not observed, it is not necessary to cover the entire surface of the collecting metal, as long as only the non-coated surface will eventually passivate without hindering the electronic exchanges at the protected surfaces level. This characteristic of the invention thus allows the optimization of the amount of mineral binder required to leave a sufficient residual porosity to allow at least superficial anchorage of the composite electrode on the protective conductive coating.

The thicknesses of the coatings of the present invention are of the order of a few microns to minimize to weight or the dead volume of the coating versus the active materials of the generator. Preferably, the thickness of the generator is less than 10 micrometers, and more preferably less than 4 micrometers.

To optimize the energetic content, an optional manner of embodying the invention comprises the use in whole or in part of an electronic conduction additive that is also an active material of the electrode, in which case a finely ground material, i.e., particle size inferior to a micrometer, will be used to reduce the stress generated by the volumic variations of the electrode material, and materials having cycling volume variations inferior to 10%, and preferably lower than 5%, will be selected. Although the amount of mineral binder is preferably comprised between about 15 and 95%, in such embodiment, the amount of mineral binder will be as high as possible, preferably higher than 30%, in order to maintain the mechanical integrity and the role of the glass binder despite the discharge/charge cycles and the volume variations.

A particularly preferred embodiment of the invention comprises the use of a lithium polyphosphate of general formula $(LiPO_3)_n$, that can be prepared in an aqueous solution from a neutralized solution of the acid $(HPO_3)_n$, preferably at a pH from 4 to 9, with a lithium salt such as $Li_2O$, LiOH or $Li_2CO_3$. The electronic conduction additive is then dispersed in the solution and coated on the current collector.

The collector coatings according to the present invention can be used on various types of current collectors, namely aluminium and aluminium metallization of a few hundred angstroms. It is interesting to note that the latter are typically incompatible with a basic mineral binder such as lithium polysilicates.

The following examples are provided to illustrate the invention, and shall not be construed as limiting its scope.

EXAMPLE 1

A solution of a binder of the type $(LiPO_3)_n$ is neutralized at a pH near 7 while a second solution is brought to a pH of 11. Both solutions are contacted with a $V_2O_5$ powder. In the first instance, i.e. when the pH is near 7, the solution maintains its $V_2O_5$-orange color, while in the second instance, a green solution resulting from the chemical reaction between the binder and the solid oxide is observed. A similar observation is made when the same vanadium oxide is contacted with an aqueous solution of lithium polysilicate. These observations are made to illustrate the importance to ensure the chemical compatibility of the collector protective mineral binder with the active materials of the electrodes, to prevent a progressive deterioration of the performance of the generator to cycling.

EXAMPLE 2

An aqueous solution of acid $(HPO_3)_n$ is neutralized at pH near 7 with lithium hydroxide. Carbon black (Ketjenblack™ EC-600) is dispersed therein in an amount of 8% by volume with respect to the glass of formula $(LiPO_3)_n$. The suspension is then coated on a 13 micrometer aluninium collector. The thickness obtained after drying at 150° C. is about 3 micrometers. A glowing and adhesive aspect of the protective coating is observed, as well as its electronic conductivity at the surface. An identical experiment using potassium hydroxide to neutralize the acid $(HPO_3)_n$ gives a sample with a coating even more flexible and adhesive.

EXAMPLE 3

An $(LiPO_3)_n$-based collector according to Example 2 is used for the preparation of an electrochemical generator according to the following steps. A composite cathode is coated on the collector protected with $(LiPO_3)_n$, of Example 2 to form a thin film from a dispersion in acetonitrile of the following elements: a) an ethylene oxide copolymer (55% volume) containing LiTFSI salt at a concentration corresponding to a molar ratio O/Li of 30; b) $V_2O_5$ powder (40%), and c) carbon black (Ketjenblack™, 5% volume). After coating, the film is dried at 80° C. under vacuum for 12 hours. A cell is prepared by assembling successively by thermal transfer the cathode films, the 20 micrometers separator also comprising and ethylene oxide copolymer and LiTFSI, and a metallic lithium anode. The reversible capacity of the battery is 5.03 $C/cm^2$. FIG. 3 illustrates the behaviour of the cell with respect to cycling at 60° C. A good maintenance of the capacity during successive cycles is observed, and mainly the maintenance of the A.S.I. (Area Specific Impendance) value, which translates the sum of ohmic resistance, charge transfer and diffusion phenomenons, and allows to determine the quality maintenance of the electrical contacts. In this example, the A.S.I. is about 100Ω after about 30 cycles.

On the other hand, FIG. 4 illustrates an identical cell using an aluminium collector non-coated with a protective coating according to the invention. Both cells are recharged under constant current in 6 hours by using a recharge superior voltage limit of 3.1 V. In the second instance, an initial significant loss of the capacity and a high A.S.I. value is observed at the very beginning of cycling. This loss is about four times higher than that of the other cell, thereby confirming the protective role of the coating being the subject of the present invention.

EXAMPLE 4

A potassium polymetaphosphate $(KPO_3)_n$-based binder obtained according to the procedure of Example 2 is used with a carbon black (Ketjenblack™) and iron phosphate dispersion having submicronic particles. The mixed protective coating has a thickness of about 4 micrometers. The visual appearance of this coating is partly shiny, confirming qualitatively the reduced porosity of the protective coating. The amount of glass used is 70% by volume relative to the iron phosphate (20% by volume) and carbon black (10% by volume), in order to obtain a coating somehow dense and only slightly porous. The electrochemical activity of this coating is tested by using the coating directly with a polymer electrolyte comprising a copolymer of ethylene oxide and LiTFSI, and an anode of metallic lithium in a set up identical to that of Example 3. An electrochemical activity characteristic of an iron phosphate additive is observed, with discharge level of 3.3 Volts and a capacity proportional to the amount of additive. A low and stable A.S.I. value is observed relative to the discharge/charge cycles.

While the invention has been described in connection with specific embodiments thereof, it will be understood that it is capable of further modifications, and this application is intended to cover any variations, uses or adaptations of the invention following, in general, the principles of the invention, and including such departures from the present description as come within known or customary practice within the art to which the invention pertains, and as may be applied to the essential features hereinbefore set forth, and as follows in the scope of the appended claims.

What is claimed is:

1. An electrochemical generator comprising a separating electrolyte between two electrodes, wherein at least one of the electrodes comprises a metallic current collector coated at least partially with a conductive coating, chemically compatible with an adjacent electrode material, the coating comprising a mineral binder being vitreous or partly vitreous and comprising an alkaline metal phosphate, an alkaline metal polyphosphate, or mixtures thereof, wherein at least one electronic conduction additive is dispersed, the coating being contacted with the collector to protect a thus coated metallic surface from the formation of passivation films.

2. An electrochemical generator according to claim 1, wherein the generator is a lithium generator and the alkaline metal comprises lithium, potassium or mixtures thereof.

3. An electrochemical generator according to claim 1, wherein the coating further comprises a glass-forming additive.

4. An electrochemical generator according to claim 1, wherein the electronic conduction additive comprises carbon black, graphites, metals, metallic conductive mineral compounds, doped conjugated polymers, and mixtures thereof.

5. An electrochemical generator according to claim 1, wherein the electronic conduction additive further comprises an electrochemically active material working as an electrode material.

6. An electrochemical generator according to claim 5, wherein the electrochemically active material is similar to said adjacent electrode material.

7. An electrochemical generator according to claim 1, wherein said at least one electrode is a cathode having a metallic collector of aluminum, or an aluminum-based metalllization collector.

8. An electrochemical generator according to claim 1, wherein said at least one electrode is a cathode comprising a vanadium oxide or a transition metal phosphate of the nasicon structure.

9. A generator according to claim 8 wherein the second electrode is a lithium anode.

10. An electrochemical generator according to claim 8, wherein the separating electrolyte is a polymer electrolyte.

11. An electrochemical generator according to claim 1, wherein said at least one electrode is an anode.

12. A process for coating at least partly a surface of a metallic collector of an electrode with a passivation protector, the process comprising:

a) preparing an aqueous dispersion solution of a mineral binder being vitreous or partly vitreous and comprising an alkaline metal phosphate, an alkaline metal polyphosphate, or mixtures thereof, wherein at least one electronic conduction additive is dispersed;

b) coating the surface of the metallic collector with the dispersion prepared in step a), followed by drying thereof to produce a partly or completely coated surface to prevent formation of passivation films.

13. A process according to claim 12, wherein in step a) a glass-forming additive is added in the dispersion.

14. A process according to claim 12, wherein the alkaline metal comprises lithium, potassium, or mixtures thereof.

15. A process according to claim 12, wherein the electronic conduction additive comprises carbon black, graphites, metals conductive mineral compounds, doped conjugated polymers, and mixtures thereof.

16. An electrode comprising a metallic current collector coated at least partly with a conductive coating, chemically compatible with an adjacent electrode material, the coating comprising a mineral binder being vitreous or partly vitreous and comprising an alkaline metal phosphate, an alkaline metal polyphosphate, and mixtures thereof, wherein is dispersed an electronic conduction additive ensuring electronic exchanges between the electrode and the collector, the coating being contacted with the collector to protect the metallic surface coated from the formation of passivation films.

17. An electrode according to claim 16, wherein the alkaline metal comprises lithium, potassium, or mixtures thereof.

18. An electrode according to claim 16, wherein the coating comprises a glass-forming additive.

19. An electrode according to claim 16, wherein the electronic conduction additive comprises carbon black, graphites, metals, metallic conductive mineral compounds, doped conjugated polymers, or mixtures thereof.

20. An electrode according to claim 16, wherein the electronic conduction additive comprises an electrochemically active material operating as an electrode material.

21. An electrode according to claim 20, wherein the electrochemically active material is similar to said adjacent electrode.

22. An electrode according to claim 19 wherein the electronic conduction additive comprises carbon black or graphite in an amount comprised between 2 and 20% by volume.

* * * * *